(12) United States Patent
Johns (10) Patent No.: US 7,673,891 B2
(45) Date of Patent: Mar. 9, 2010

(54) SUSPENSION SYSTEM SHACKLE LINK WITH SHOCK ABSORBER

(75) Inventor: Stephen J. Johns, Elkhart, IN (US)

(73) Assignee: Lippert Components Inc., Goshen, IN (US)

( * ) Notice: Subject to any disclaimer, the term of this patent is extended or adjusted under 35 U.S.C. 154(b) by 217 days.

(21) Appl. No.: 11/834,757

(22) Filed: Aug. 7, 2007

(65) Prior Publication Data

US 2009/0039611 A1     Feb. 12, 2009

(51) Int. Cl.
*B60G 7/00* (2006.01)

(52) U.S. Cl. .......................... 280/124.17; 280/124.173; 280/124.174; 280/124.175

(58) Field of Classification Search ............ 280/124.17, 280/124.174, 124.175
See application file for complete search history.

(56) References Cited

U.S. PATENT DOCUMENTS

| 3,833,236 | A | * | 9/1974 | Davis et al. ................. 280/676 |
| 4,033,606 | A | * | 7/1977 | Ward et al. .................. 280/682 |
| 4,362,318 | A | * | 12/1982 | Lampert .............. 280/124.175 |
| 4,412,690 | A | * | 11/1983 | Prokop et al. ............... 280/686 |
| 4,998,749 | A | * | 3/1991 | Bockewitz .............. 280/6.159 |
| 6,019,384 | A | * | 2/2000 | Finck .................... 280/124.17 |
| 6,176,478 | B1 | * | 1/2001 | Heitzmann .................. 267/269 |
| 6,435,532 | B2 | * | 8/2002 | Hildebrand .......... 280/124.175 |
| 6,478,321 | B1 | * | 11/2002 | Heitzmann .......... 280/124.177 |
| 6,485,040 | B1 | * | 11/2002 | Dudding .............. 280/124.175 |
| 7,229,088 | B2 | * | 6/2007 | Dudding et al. ........ 280/124.17 |
| 7,296,821 | B2 | * | 11/2007 | Fenton ....................... 280/680 |
| 7,537,226 | B1 | * | 5/2009 | Collazo ............... 280/124.175 |
| 2007/0040347 | A1 | * | 2/2007 | Fenton ................ 280/124.174 |
| 2007/0052195 | A1 | * | 3/2007 | Collazo ............... 280/124.175 |

* cited by examiner

*Primary Examiner*—Toan C To
(74) *Attorney, Agent, or Firm*—Barnes & Thornburg LLP (57) ABSTRACT

A shackle of a suspension system that connects a leaf spring to a vehicle frame. The shackle pivots, allowing the leaf spring to swing. The shackle is configured so that its effective length changes in response to shock. An elastic member is included in the shackle to resist this change in length and absorb shock.

25 Claims, 7 Drawing Sheets

SUSPENSION SYSTEM SHACKLE LINK WITH SHOCK ABSORBER

BACKGROUND OF THE INVENTION

This invention relates to a shackle attached to the leaf spring of a suspension system in order to accommodate flex of the leaf spring.

Vehicle suspension systems often include leaf springs which attach to the frame of the vehicle and support the vehicle's axle. Typically, one end of the leaf spring is pivotally attached directly to the frame. The other end of the leaf spring is typically attached to the frame or an equalizer through a pair of shackles. The shackles are pivotally connected to the leaf spring at one end and the frame or equalizer on the other end. The shackle allows the leaf spring to flex in order to absorb the effective change in length of the spring as it flexes.

While the invention is described in relation to a shackle for a leaf spring suspension system, it will be evident that it can be employed in other ways, including as an equalizer between leaf springs.

SUMMARY OF THE INVENTION

The invention is directed to a shackle for a leaf spring suspension system that compresses in response to force. The shackle includes an elastic member that absorbs shocks transferred though the leaf springs. The shackle is pivotally connected to the vehicle frame or equalizer at one end and is pivotally connected to the leaf spring at the other end. In one embodiment, the connection between at least one of the frame and leaf spring is slotted, allowing movement relative to the shackle. An elastic member is disposed inside the shackle to resist movement along the slot.

In operation, shocks that are transmitted from the leaf spring are not entirely absorbed by the pivotal movement of the shackle. The remaining shock causes movement along the direction of the slot in the shackle. This movement is resisted by an elastic member inside the shackle and consequently absorbs a portion of the shock.

BRIEF DESCRIPTION OF THE DRAWINGS

The drawing figures illustrate seven forms of the present invention, in which.

DESCRIPTION OF EXAMPLES EMBODYING

The Best Mode of the Invention

Figure 1:
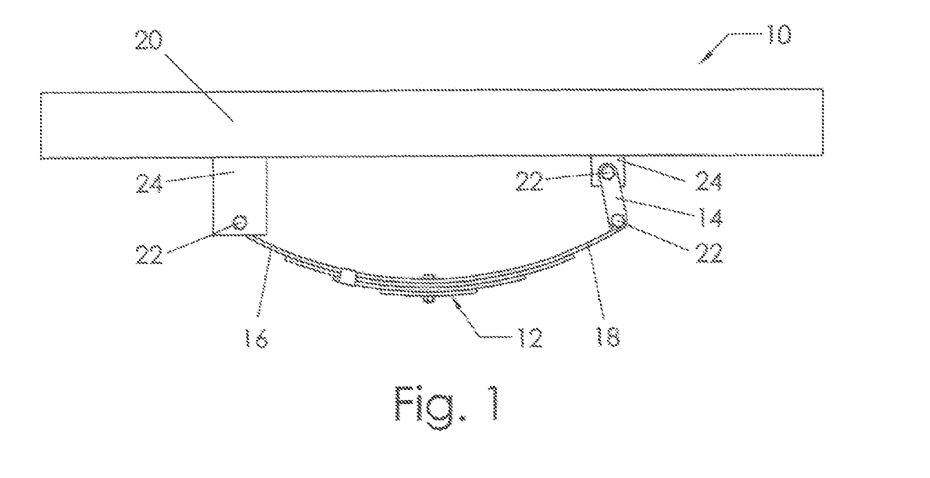
FIG. 1 illustrates a conventional vehicle suspension system with a leaf spring.

A conventional vehicle's suspension system 10 consisting of a leaf spring 12 and a pair of shackles 14 is shown in FIG. 1. The leaf spring 12 has two ends, a pivot end 16 and a swing end 18. The pivot end 16 is pivotally connected to a vehicle's frame 20 by a bolt 22 and frame bracket 24. The swing end 18 of the leaf spring 12 is pivotally connected to a pair of shackles 14 using a bolt 22. The other end of the shackles 14 is connected to the vehicle's frame 20 by a bolt 22 and frame bracket 24.

Figure 2:
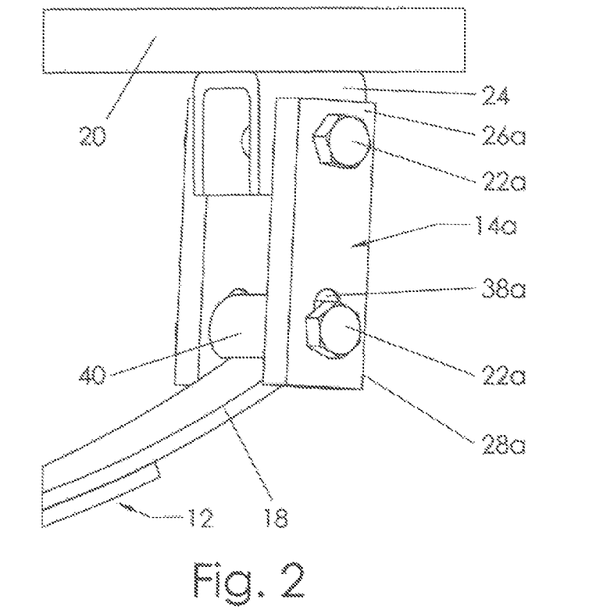
FIG. 2 is an enlarged perspective view of a pair of shackles according to a first embodiment of the invention when attaching the leaf spring to the frame of the vehicle.
Figure 3:
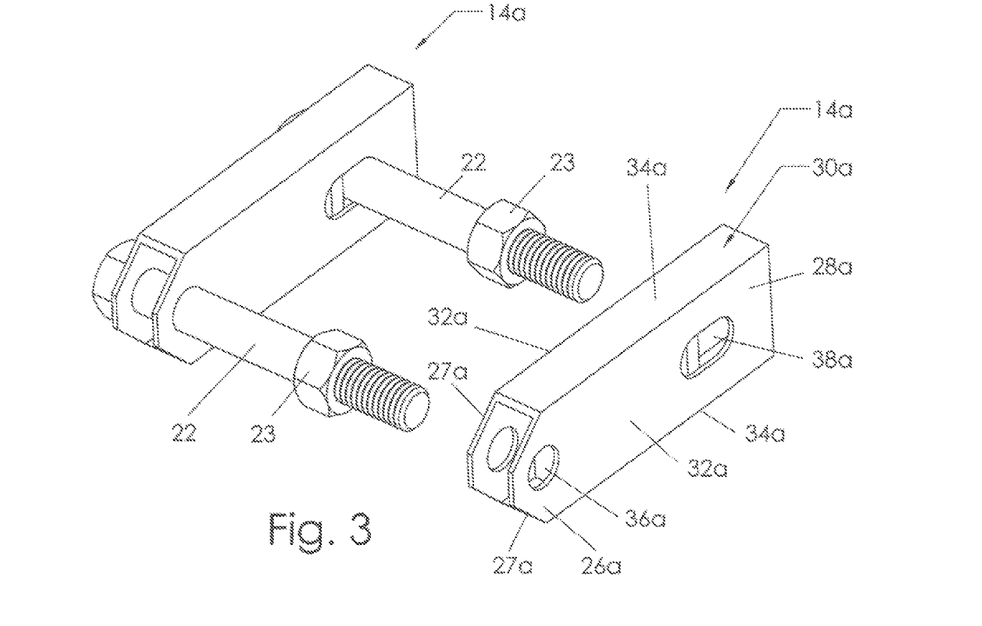
FIG. 3 is an exploded perspective view of the pair of shackles from FIG. 2, shaped slightly differently.
Figure 4:
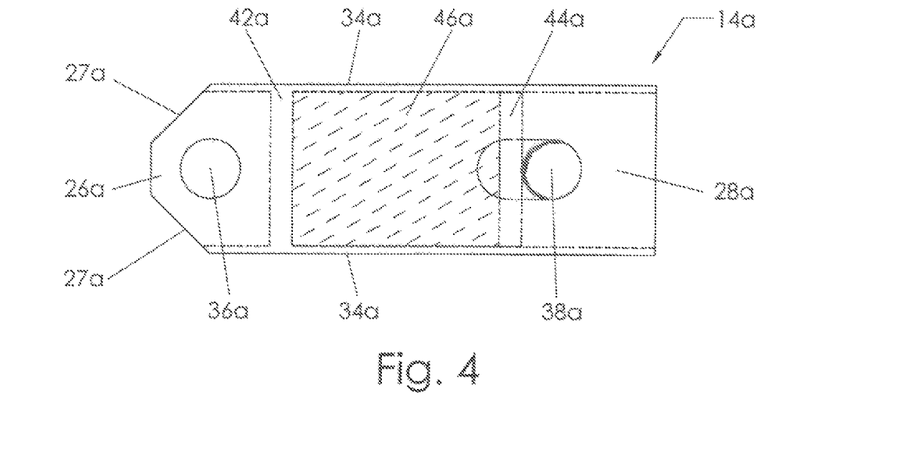
FIG. 4 is an elevational view of the first embodiment of the shackle.

The various embodiments of the invention continue to use the reference characters identified above, adding letters corresponding to the each particular embodiment to identify the novel elements of the invention. A first such embodiment is illustrated in FIGS. 2-4. As seen in FIG. 2, a shackle 14a according to a first embodiment of the invention is positioned on either side of the leaf spring 12 to form a pair of shackles 14a. The shackle 14a has a shackle upper end 26a connected to the frame bracket 24 and a shackle lower end 28a connected to the leaf spring 12. The edges of upper end 28a of shackle 14a shown in FIGS. 3 and 4 may include slants 27a on both sides to prevent interference with the frame 20 as the shackle 14a moves. The slants 27a may not be needed depending on the clearance between the frame 20a and leaf spring 14a.

FIGS. 3 and 4 show that shackle 14a consists of a square tube structure 30a with two face plates 32a being connected by two preferably integral side plates 34a. A hole 36a extends through both face plates 32a at the shackle upper end 26a. The shackles 14a are pivotally attached to the frame 20 by bolt 22, which passes through holes 36a, through the frame bracket 24 and through the holes 36a in the other shackle 14a. Nuts 23 hold the assembly in place.

The face plates 32a also include slots 38a at the shackle lower end 28a. The shackles 14a are pivotally attached to the leaf spring 12 by bolt 22. The bolt 22 passes through slots 38a in both face plates 32a, through a collar 40 at the swing end 18 of the leaf spring 12 and then through the slots 38a in the other shackle 14a. The bolts 22 may also include grease fittings (not illustrated).

As seen in FIG. 4, inside the shackle 14a is a stationary plate 42a, paddle 44a, and an elastic member 46a therebetween. The stationary plate 42a is located in the shackle upper end 26a and the paddle 44a is in the shackle lower end 28a. The elastic member 46a consists of an isoprene natural rubber or any other sufficiently elastic and durable material. The plate 42a, paddle 44a, and other components of the shackle 14 may be constructed from a sufficiently robust material, such as metal.

The paddle 44a moves within the tube structure 30a between the bolt 22 and elastic member 46a. The elastic member 46a is formed so that, absent an outside force, the force of the elastic member 46a through the paddle 44a pushes the bolt 22 in the slot 38a.

Whenever a shock is transmitted from the leaf spring 12 to the shackle 14a, bolt 22 in slot 38a exerts a force on the paddle 44a and elastic member 46a. This force causes the elastic member 46a to compress against the stationary plate 42a. The paddle 44a accordingly moves (to the left in FIGS. 3 and 4) and bolt 22 moves along the slot 38a. In this way, the shock from the leaf spring 12 is partially absorbed and not transferred to the frame 20. The distance between the attachment to the leaf spring 12 and frame 20 is accordingly reduced. The paddle 44a helps prevent excess wear on the elastic member 46a by distributing the load of the shock.

The shackle 14a components can be arranged in a variety of ways. For example, the arrangement of the shackle 14a can be reversed so that the paddle 44a and slot 38a are located in the shackle upper end 26a and the hole 36a is in the shackle lower end 28a. The embodiments described below illustrate that a wide range of other design configurations are possible. Additionally, features from these embodiments can also be combined to form new embodiments that are contemplated by this disclosure.

Figure 5:
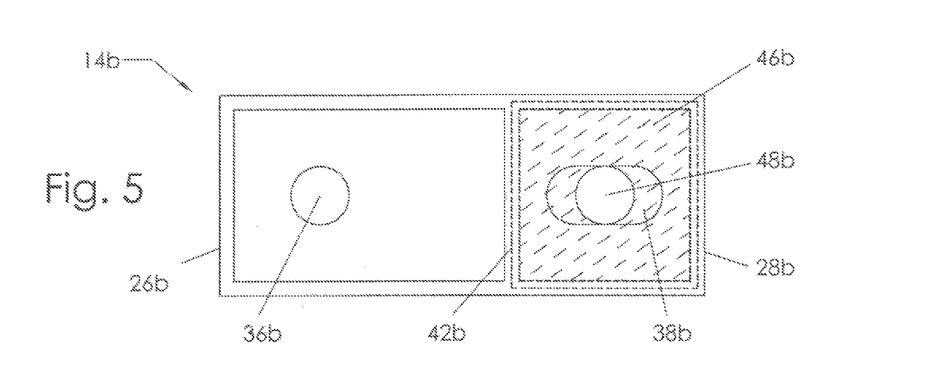
FIG. 5 is an elevational view of a second embodiment of the shackle.
Figures 6, 7:
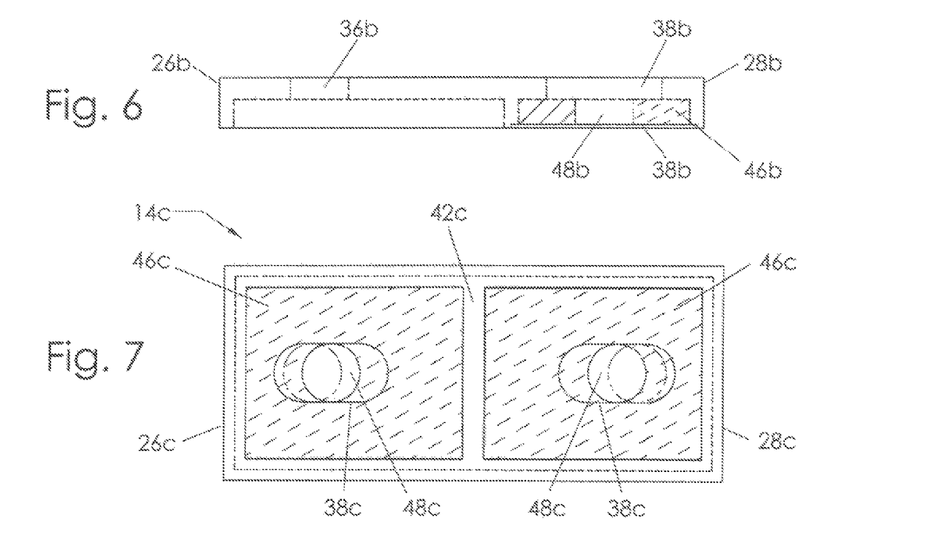
FIG. 6 is a side view of the second embodiment of the shackle.
FIG. 7 is an elevational view of a third embodiment of the shackle.

A second embodiment of a shackle 14b is shown in FIGS. 5 and 6. The elastic member 46b is located in the lower end 28b and is formed with a hole 48b that is located in the center of slot 38b. Hole 36b is located in the shackle upper end 26b. Bolt 22 passes through hole 36b, attaching the shackle 14b to the frame bracket 24. Another bolt 22 passes through hole 48b, attaching the shackle 14b to the leaf spring 12.

Between the shackle upper end 26b and lower end 28b is a stationary plate 42b that may comprise an integral part of the shackle 14b. Stationary plate 42b retains elastic member 46b inside the shackle lower end 28. In an alternative embodiment, the shackle 14b is configured so that the elastic member 46b is located in the upper end 26b, and not the lower end 28b Whenever a shock is transmitted from the leaf spring 12 to the shackle 14b, bolt 22 in hole 48b exerts a force on the elastic member 46b. This force causes the elastic member 46b to deform against the stationary plate 42b and the shackle lower end 28b. Bolt 22 in hole 48b accordingly moves along slot 38b. In this way, the shock from the leaf spring 12 is partially absorbed and not transferred to the frame 20. The distance between the attachment to the leaf spring 12 and frame 20 is accordingly altered.

Figure 8:
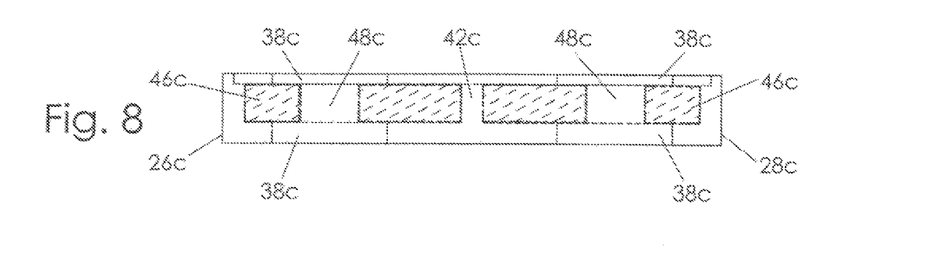
FIG. 8 is a side view of the third embodiment of the shackle.

FIGS. 7 and 8 show a third embodiment of shackle 14c using two elastic members 46c and two slots 38c. Elastic members 46c are located in both the upper end 26c and lower end 28c. Both elastic members 46c are formed with holes 48c located in the center of slots 38c in the upper end 26c and lower end 28c. Bolts 22 pass through holes 48c attaching the shackle 14c to the frame bracket 24 and leaf spring 12.

Between the shackle upper end 26c and lower end 28c is a stationary plate 42c that is preferably formed as an integral part of the shackle 14c. Stationary plate 42c separates elastic members 46c inside the upper end 26 and lower end 28 individually. In an alternative embodiment, the shackle 14c may be configured without a stationary plate 42c and only a single elastic member 46c.

Whenever a shock is transmitted from the leaf spring 12 to the shackle 14c, each bolt 22 in holes 48c exerts a force on each elastic member 46c. This force causes the elastic members 46c to deform. Bolts 22 in holes 48c accordingly move along slots 38c. In this way, the shock from the leaf spring 12 is partially absorbed and not transferred to the frame 20. The distance between the attachment to the leaf spring 12 and frame 20 is accordingly altered.

Figure 9:
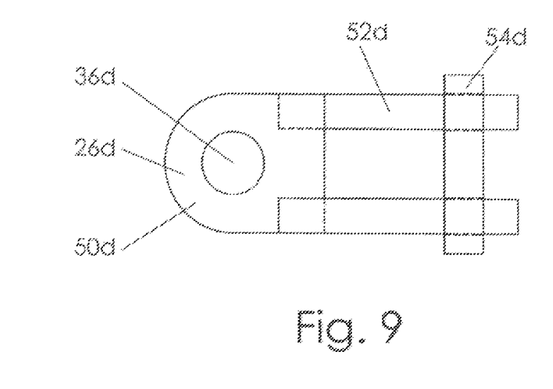
FIG. 9 is an elevational view of one half of a fourth embodiment of the shackle.
Figure 10:
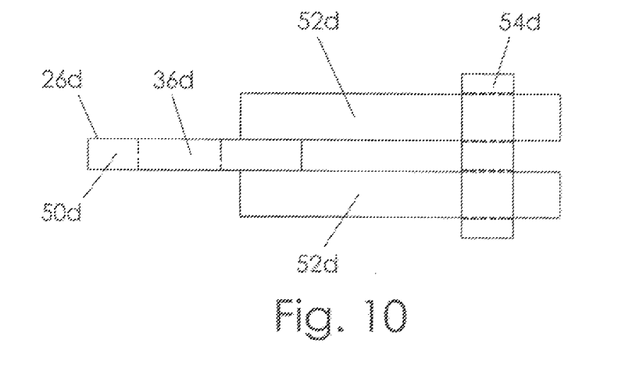
FIG. 10 is a side view of one half of a fourth embodiment of the shackle.

FIGS. 9, 10, 11, and 12 show a fourth embodiment of the shackle 14d. As seen best in FIG. 11, attachment plates 50d with holes 36d are located at both the upper and lower shackle ends 26d and 28d of the shackle 14d. FIG. 9 illustrates one half of the shackle 14d and shows two offset tines 52d extending from the opposite sides of each attachment plate 50d. Also showing one half of the shackle 14d, FIG. 10 (somewhat enlarged compared in relation to FIG. 9) shows that one of the two tines 52d is attached on one side the attachment plate 50d, and the other tine 52d is attached on the other side of the attachment plate 50d. A fixed plate 54d is attached across each set of tines 52d.

Figure 11:
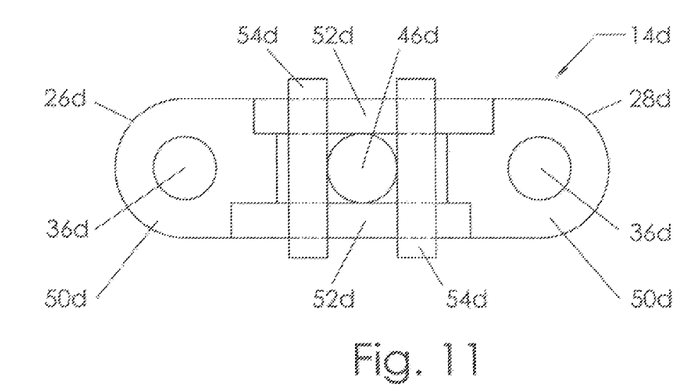
FIG. 11 is a elevational view of the assembled fourth embodiment of the shackle.
Figure 12:
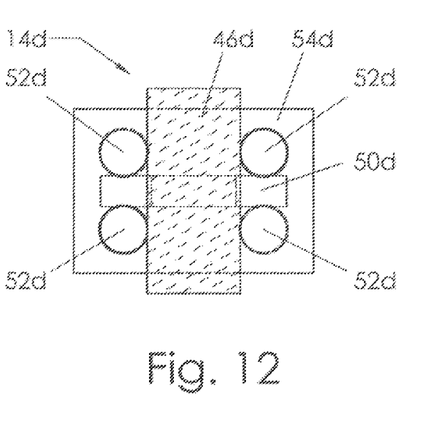
FIG. 12 is a end view of the assembled fourth embodiment of the shackle.

FIGS. 11 and 12 show the assembled shackle 14d. The two halves are assembled together to form a box structure. A cylindrically shaped elastic member 46d is located in the space between the tines 52d and fixed plates 54d. Shock is transmitted through the fixed plates 54d and absorbed by the elastic member 46d. As a result, the upper and lower shackle ends 26d and 28d move away from each other and the distance between the attachment to the leaf spring 12 and frame 20 is accordingly increased.

Figure 13:
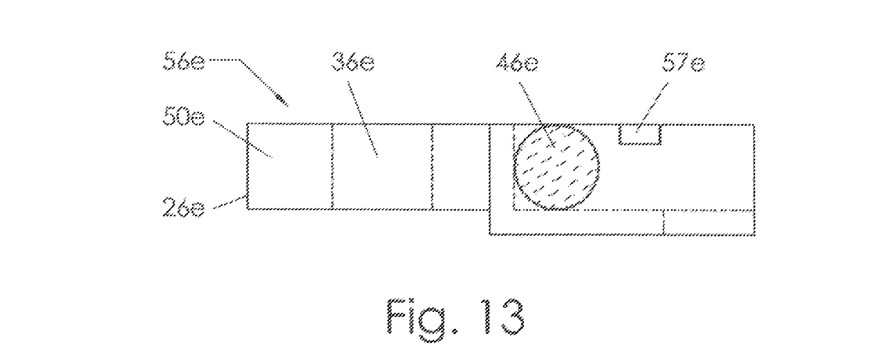
FIG. 13 is a side view of a receiving portion of a fifth embodiment of the shackle.
Figure 14:
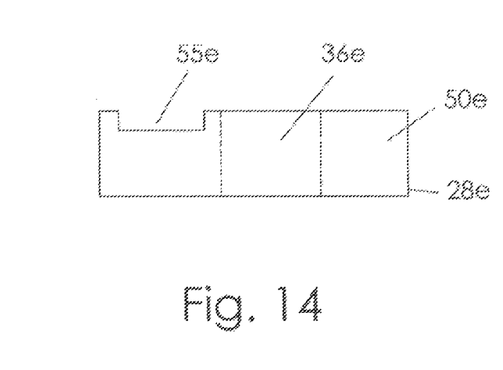
FIG. 14 is a side view of a key portion of the fifth embodiment of the shackle.
Figure 15:
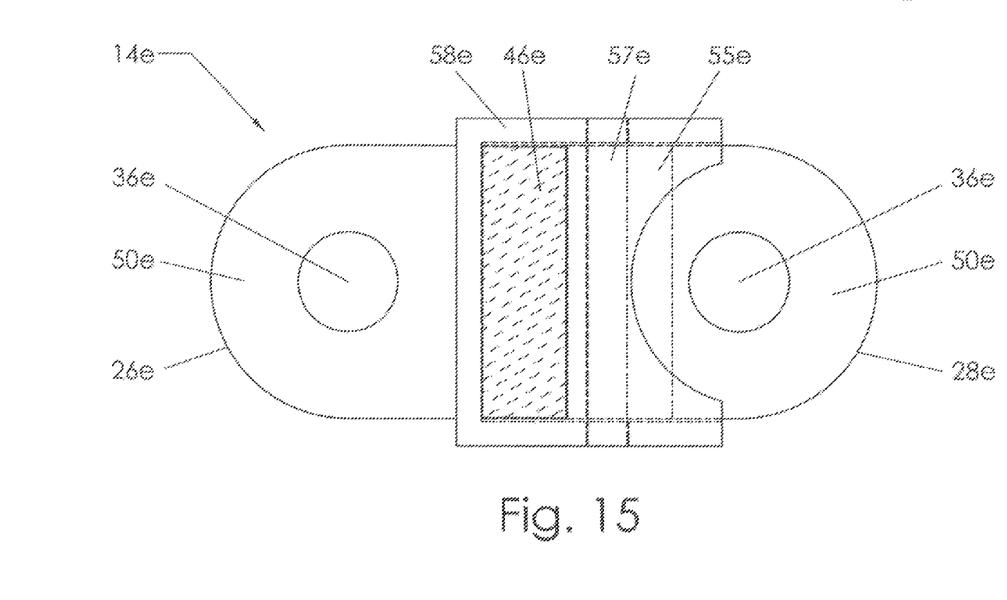
FIG. 15 is an elevational view of the assembled fifth embodiment of the shackle.

A fifth embodiment of shackle 14e is shown in FIGS. 13, 14, and 15. Attachment plates 50e with holes 36e are located at both the upper and lower shackle ends 26d and 28d of the shackle 14e. As seen in FIG. 14, a key section 55e is attached to one of the attachment plates 50e. As seen in FIG. 13, a receiving section 56e with a lock bar 57e is attached to the other attachment plate 50e.

The assembled shackle 14e is shown in FIG. 15. The key section 55e is fitted into the receiving section 56e so that the end of the key section 55e is on the opposite side of the lock bar 57e. A cylindrically shaped elastic member 46e is located in the receiving section 56e beyond where the key section 55e extends absent an outside force. A cover plate 58e is fitted over top of the assembled shackle 14e. The shackle 14e may also be designed so that the locking bar 57e is part of the cover plate 58e.

In this embodiment, a shock causes the key section 55e to push and compress the elastic member 46e against the receiving section 56e. The distance between the attachment to the leaf spring 12 and frame 20 is accordingly reduced.

Figure 16:
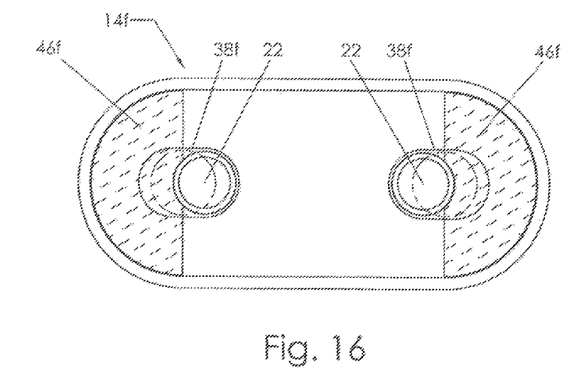
FIG. 16 is an elevational view of a sixth embodiment of the shackle.

FIG. 16 shows a sixth embodiment with an elastic members 46f located at either end of the shackle upper end 26f and shackle lower end 28f. The embodiment has slots 38f in both the upper and lower shackle ends 26f and 28f. The elastic members 46f are sized to locate the bolts 22 in the inner most portion of the slots 38f absent an outside force. A shock is transferred through the bolts 22 and absorbed by the elastic members 46f, forcing the bolts 22 outwardly along the slots 38f. The distance between the attachment to the leaf spring 12 and frame 20 is accordingly increased.

Figure 17:
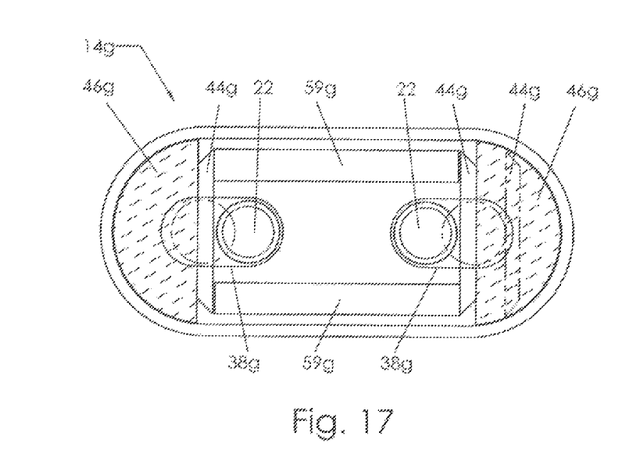
FIG. 17 is an elevational view of a seventh embodiment of the shackle.

FIG. 17 illustrates a seventh embodiment that is similar to the sixth embodiment shown in FIG. 16. This seventh embodiment involves the addition of paddles 44g and torsion bars 59g. The paddles 44g are positioned between the bolts 22 and the elastic members 46g. The torsion bars 59g run between the paddles 44g and help prevent twisting as shocks are applied and help to locate the paddles 44g.

Figure 18:
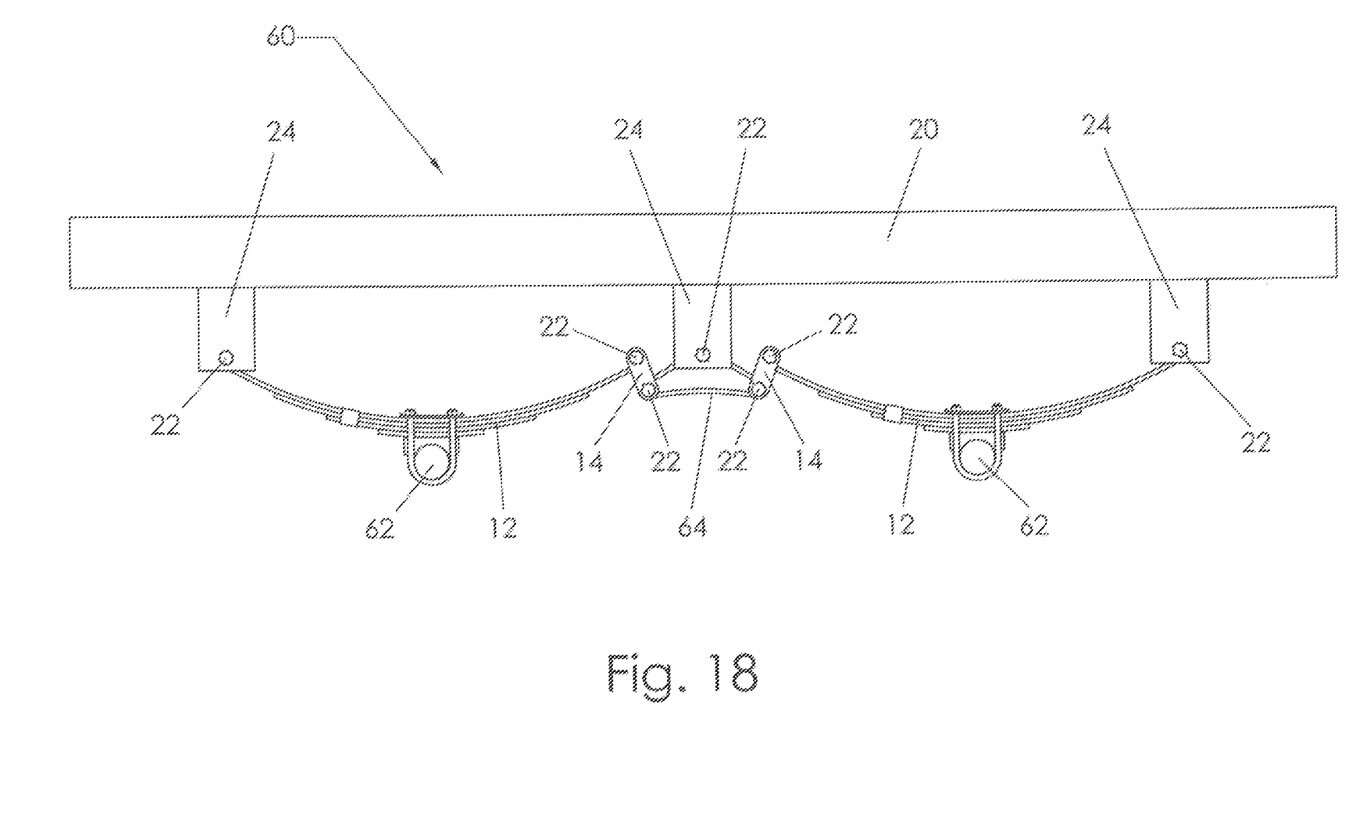
FIG. 18 illustrates a conventional dual axle suspension system.

The embodiments described above would also be suitable for use with dual axle suspension system 60, as shown in FIG. 18. Dual axle suspension system 60 includes two axles 62 and two leaf springs 12. Each leaf spring 12 is attached to the frame 20 through a frame bracket 24 at one end and a shackle 14 at the other end. The other end of the shackle 14 of both leaf springs 12 is connected to opposite ends of a single equalizer 64. The equalizer 64 is pivotally connected to a frame bracket 24.

The shackles 14 of the present invention are in an inverted orientation when used with dual axle suspension system 60 as compared to conventional suspension system 10. Typically, shocks exert an upward force on the leaf spring 12. Because of the inverted orientation, this upward force shock will push upwardly on the shackle 14 when used in conventional suspension system 10 and will push upwardly on the shackle 14 when used in dual axle suspension system 60.

The upwardly force typically experienced by the shackle 14 used in conventional suspension system 10 places the shackle 14 in compression. In contrast, the upwardly force typically experienced by the shackle 14 used in dual axle suspension system 60 places the shackle 14 in tension. Different configurations of the invention are useful to accommodate the different forces experienced by the two suspension systems.

The first and fifth embodiments have been configured to operate in compression and are best suited for conventional suspension system 10. The fourth, sixth, and seventh embodiments are configured to operate in tension and are best suited for dual axle suspension system 60. The second and third embodiments are configured to work in both tension and compression and are equally suited for either conventional suspension system 10 or dual axle suspension system 60.

Of course, each of the embodiments described can be used with either the conventional suspension system 10 or dual axle suspension system 60. Leaf springs experience a wide range of forces beyond solely upward forces. Accordingly, it is contemplated that each of the embodiments can be used for the conventional suspension system 10, the dual axle suspension system 60, or other suspension systems incorporating shackles 14.

The invention can be used on a wide range of vehicles, machines, and structures that utilize suspension systems. As can be seen from the numerous embodiments described above, various changes can be made to the invention without departing from the spirit thereof or scope of the following claims.

What is claimed is:

1. A shackle for a suspension system for a vehicle having a leaf spring attached to a frame of the vehicle by the shackle, the shackle comprising
   a. a leaf spring attachment point for attachment of the leaf spring to the shackle,
   b. a frame attachment point for attachment of the vehicle to the shackle,
   c. a means for changing the distance between the leaf spring attachment point and frame attachment point in response to shock, the changing means including an elastic member in the shackle, and a bolt extending through a slot in the shackle to form one of said attachment points, the bolt engaging the elastic member such that the bolt compresses the elastic member and moves along the slot in response to shock.

2. The shackle according to claim 1, wherein the changing means includes a paddle located between the bolt and elastic member in the shackle.

3. The shackle according to claim 2, in which the bolt engages the paddle such that the paddle compresses the elastic member as the bolt moves along the slot in response to shock.

4. The shackle according to claim 1, wherein the changing means further comprises a receiving section of the shackle and a key section of the shackle wherein the key section fits into the receiving section with an elastic member sandwiched between the receiving section and key section.

5. The shackle according to claim 4, in which the receiving section and key section move toward each other and compress the elastic member in response to shock.

6. The shackle according to claim 1, in which the distance between the leaf spring attachment point and frame attachment point decreases in response to shock.

7. A shackle for a vehicle suspension system comprising
   a. a box structure having one end attached to a vehicle frame and having an opposite end attached to a leaf spring,
   b. a slot formed through the box structure with a bolt extending through the slot for attachment of the shackle to at least one of the frame and leaf spring,
   c. an elastic member disposed in the box structure such that compression or tension of the elastic member during shock allows the bolt to move in the slot.

8. The shackle according to claim 7, in which the shackle further comprises a paddle positioned between the bolt and elastic member.

9. A shackle for a vehicle suspension system the shackle being attached to the vehicle frame at one end and to a leaf spring at an opposite end, the shackle comprising
   a. two interlocking sections,
   b. an opening formed in the interlocking sections,
   c. an elastic member disposed inside the opening, such that movement of the interlocking sections causes compression of the elastic member.

10. A shackle for a dual axle suspension system for a vehicle having a pair of opposite leaf springs attached to a equalizer of the vehicle by the shackle, the shackle comprising
    a. a leaf spring attachment point for attachment of a leaf spring to the shackle,
    b. a equalizer attachment point on the equalizer for attachment of the leaf equalizer to the shackle,
    c. a means for changing the distance between the leaf spring attachment point and equalizer attachment point in response to shock.

11. The shackle according to claim 10, wherein the changing means includes an elastic member in the shackle.

12. The shackle according to claim 11, wherein the changing means includes two interlocking sections of the shackle with an elastic member sandwiched between the two interlocking sections.

13. The shackle according to claim 12, in which the interlocking sections move outward and compress the elastic member in response to shock.

14. The shackle according to claim 10, in which the distance between the leaf spring attachment point and equalizer attachment point increases in response to shock.

15. The shackle according to claim 10, wherein the changing means includes at least one elastic member disposed in at least one end of the shackle.

16. The shackle according to claim 15, wherein the changing means includes a bolt extending through a slot in the shackle to form one of said attachment points.

17. The shackle according to claim 16, in which the bolt is in contact with the elastic member such that the bolt compresses the elastic member and moves along the slot in response to shock.

18. The shackle according to claim 15, wherein the changing means includes a paddle located between the bolt and elastic member in the shackle.

19. The shackle according to claim 18, in which the bolt is in contact with the paddle such that the paddle compresses the elastic member as the bolt moves outward along the slot in response to shock.

20. The shackle according to claim 19, wherein the changing means is at located at both a leaf spring attachment end of the shackle and a equalizer attachment end of the shackle.

21. The shackle according to claim 20, wherein the changing means includes torsion bars extending between the paddles.

22. A shackle for a suspension system for a vehicle having a leaf spring attached to a frame of the vehicle by the shackle, the shackle comprising
   a. a leaf spring attachment point for attachment of the leaf spring to the shackle,
   b. a frame attachment point for attachment of the vehicle to the shackle,
   c. a means for changing the distance between the leaf spring attachment point and frame attachment point in response to shock, the changing means including an elastic member in the shackle and a bolt extending through a slot in the shackle to form one of said attachment points, the changing means including a paddle located between the bolt and elastic member in the shackle.

23. The shackle according to claim 22, in which the bolt engages the paddle such that the paddle compresses the elastic member as the bolt moves along the slot in response to shock.

24. A shackle for a suspension system for a vehicle having a leaf spring attached to a frame of the vehicle by the shackle, the shackle comprising
   a. a leaf spring attachment point for attachment of the leaf spring to the shackle,
   b. a frame attachment point for attachment of the vehicle to the shackle,
   c. a means for changing the distance between the leaf spring attachment point and frame attachment point in response to shock, the changing means comprising a receiving section of the shackle and a key section of the shackle wherein the key section fits into the receiving section with an elastic member sandwiched between the receiving section and key section.

25. The shackle according to claim 24, in which the receiving section and key section move toward each other and compress the elastic member in response to shock.

* * * * *